Oct. 26, 1943.    L. W. THOMPSON    2,332,951
BATTERY CHARGING CONTROL DEVICE
Filed Jan. 28, 1942

Inventor:
Louis W. Thompson,
by Harry E. Dunham
His Attorney.

Patented Oct. 26, 1943

2,332,951

UNITED STATES PATENT OFFICE 2,332,951

BATTERY CHARGING CONTROL DEVICE

Louis W. Thompson, Schenectady, N. Y., assignor to General Electric Company, a corporation of New York Application January 28, 1942, Serial No. 428,474

2 Claims. (Cl. 171—314)

My invention relates to battery charging control devices and has for its object a reliable and inexpensive battery charging device and means for rendering the device unresponsive to close the charging circuit in the event of reversed polarity of the generator.

In carrying out my invention in one form I provide an electric valve in circuit with the voltage coil of the device whereby the coil is energized in response to the voltage of the generator when the polarity of the generator is correct and whereby no current is supplied to the coil and the coil is not energized in the event of reversed polarity of the generator.

Figure 1:
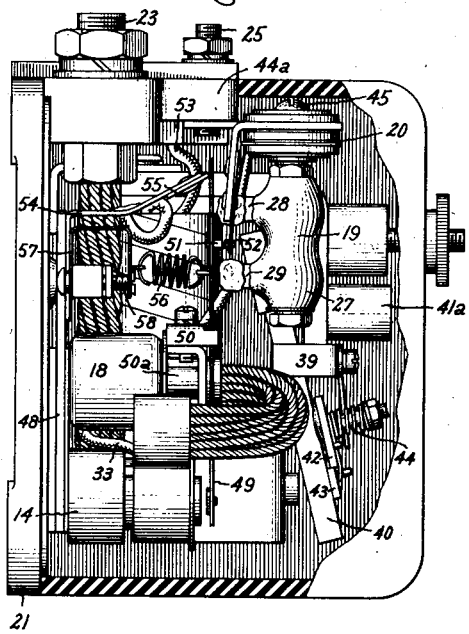
Figure 2:
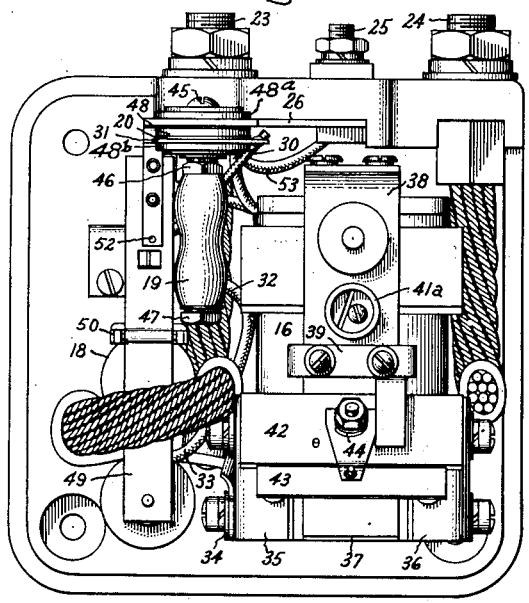
Figure 3:
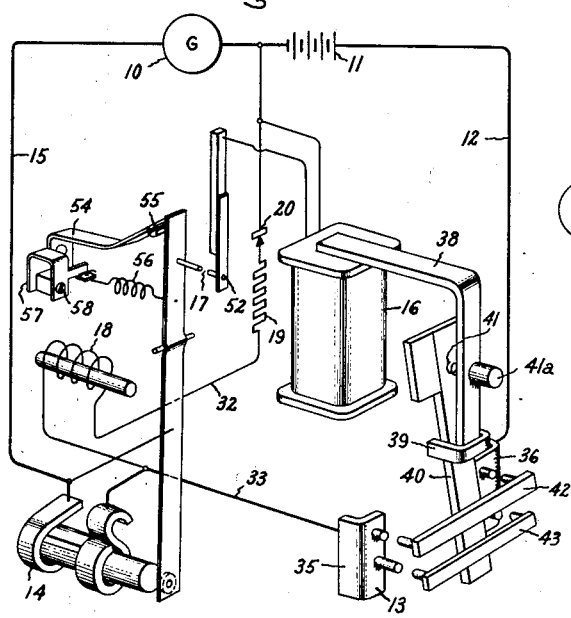

For a more complete understanding of my invention, reference should be had to the accompanying drawing in which Fig. 1 is a side elevation view of a battery charging control device embodying my invention; Fig. 2 is a plan view of the device shown in Fig. 1 with the cover removed; Fig. 3 is a simplified exploded view of the parts of the device connected in a battery charging circuit; while Fig. 4 is a diagram of connections of the battery charging system embodying my invention.

Figure 4:
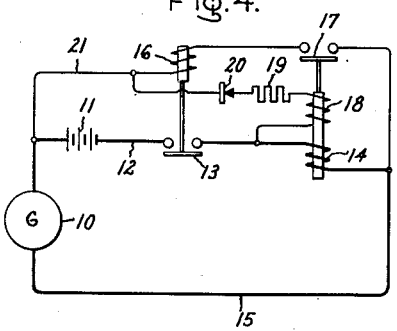

Referring to the drawing, particularly Fig. 4, in one form of my invention the charging direct current electric generator 10 driven by a suitable means (not shown), such as the axle of a railway car on which the generator is mounted, is electrically connected in circuit with the electric storage battery 11 which is to be charged by the generator. This charging circuit leads from the generator through the battery 11, the conductor 12, charging switch 13, the current coil 14 and the conductor 15 back to the other side of the generator. The switch 13 is biased to its open position and is moved to its closed circuit position by means of a coil 16 connected across the generator 10 through a relay control switch 17 which is operated by the joint action of the current coil 14 and a generator voltage responsive coil 18.

This coil 18 has one terminal connected to the battery charging circuit on one side of the switch 13 so that it is connected through the current coil 14 and the conductor 15 directly to one side of the generator. The other or upper terminal of the coil 18 is connected through a current limiting resistance 19, an electric valve 20 shown as a copper oxide rectifier, and conductor 21 directly to the other side of the generator.

Thus in the operation of the system, assuming that the generator speed is so low that its voltage is below the required battery charging voltage and that the switch 13 is open, when the speed of the generator increases so that its voltage reaches a predetermined generator charging voltage, the coil 18 connected across the generator is energized sufficiently to pick up its armature and close the control switch 17. This connects the coil 16 directly across the generator and the coil 16 thereupon closes the switch 13 for completion of the battery charging circuit.

It will be understood that the electric valve 20 is connected in the circuit in such direction that it passes current through the coil 18 in response to a generator voltage of the predetermined battery charging polarity. In the event, however, that the generator voltage becomes reversed in polarity, which might result from a reversal of its direction of rotation, the valve 20 does not pass current to the coil 18 and, consequently, the control switch 17 remains open regardless of the value of this reversed generator voltage.

During the charging of the battery, the relay switch 17 is maintained closed by the combined effect of the voltage coil 18 and the current coil 14 which acts cumulatively with respect to the voltage coil. In the event that the generator voltage decreases to a value lower than the battery voltage, the battery discharges through the generator thereby producing a reversed current in the coil 14 which thereupon opposes the voltage coil 18 and causes the switch 17 to open for deenergization of the coil 16 and opening of the switch 13 whereby the battery is disconnected from the generator.

In the event that the voltage of the generator becomes reversed for any reason, as by the reversal of its field or the reversal of its rotation, the voltage coil 18 is not energized because the valve 20 is connected to prevent the flow of current of any value sufficient to cause the closure of the switch 17 in response to a voltage of that reversed polarity. Therefore, the relay switch 17 can not close in response to this reversed voltage and the charging circuit remains open.

As shown in Figs. 1, 2 and 3, the control device is mounted on a base 21 made of electrically insulating material. The two terminals of the charging generator 10 are connected by suitable conductors to the binding posts 23 and 24. One terminal of the generator, preferably the negative terminal, is connected to the control binding post 25 which is connected through an electrically conducting and supporting plate 26 to the copper oxide rectifier 20, the opposite terminal of which is connected to one side of the resistance 19. As shown, the resistance 19 is of a type having its resistance surrounded and sealed by a layer 27 of refractory electrically insulating material such as porcelain or glass, the resistance being cylindrical in shape. The two terminals 28 and 29 of the resistance project from one side. One of these terminals 28 is connected through a conductor 30 (Fig. 2) to a plate 31 forming one terminal of the rectifier 20. The other terminal 29 of the resistance is connected through the conductor 32 to one side of the voltage coil 18, the other side of which is connected through the conductor 33 to the point 34 on one of the stationary terminals 35 of the switch 13. A similar second stationary terminal 36 is provided in spaced electrically insulating relation with the terminal 35.

These switch terminals are mounted on suitable electrically insulating supports on opposite sides of the iron core member 37 for the coil 16 in electrically insulated relation with the core member 37 and with each other. This core member 37 forms part of a magnetic core extending through the oil 16 and connecting at the upper end of the coil as seen in Figs. 1 and 2 with an L-shaped magnet core member 38. The other end of the core member 38 carries a U-shaped bracket 39 between the sides of which an armature member 40 is pivotally mounted at an intermediate point of the armature member. A helical spring 41 mounted in a tubular support 41a on the core member 38 bears on the armature 40 and biases it in a counterclockwise direction, as seen in Fig. 3, to the position shown.

On the lower end of the armature 40, as seen in Figs. 1 and 2, are mounted two bars 42 and 43 which constitute electric bridge members for electrically connecting together the terminals 35 and 36. It will be understood that these bridging members 42 and 43 make electric contact each at its respective ends with electrical contacts on the terminals 35 and 36. The bridging member 42 has much greater cross section than the member 43 and hence much greater current carrying capacity. It is so mounted as to engage its stationary contacts after the smaller bridging member 43 engages its contacts to establish a circuit. In other words, a bridging circuit between the contacts 35 and 36 is always initially closed or opened through the bridging member 42 which has a smaller cross section and therefore a higher electric resistance as compared with the member 42. This arrangement serves to prevent arcing and welding of the contacts. The two bridging members are held resiliently against the end of the armature 40 by a helical spring 44.

The supporting plate 26 of electrically conducting material is secured as shown to an upwardly extending portion 44a made of electrically insulating material secured to the base 21. Also as shown, the binding posts 23 and 24 are secured to this portion 44a. In addition to forming an electric conductor, the plate 26 acts as a supporting bracket for the copper oxide electric valve 20 and for the resistance 19. As shown, a bolt 45 extends through the copper oxide rectifier and the resistance 19, it being provided with two clamping nuts 46 and 47. Thus the nut 46 is turned tight against the copper oxide rectifier to secure its plates together, there being a copper oxide rectifier washer 48 with an electrically conducting washer on each side of it and these three washers being clamped between the plate 26 and the plate 31. Thus the plates 26 and 31 form terminals for the copper oxide rectifier. These two plates 26 and 31 are provided with enlarged openings through them for the bolt 45, openings of similar size being provided in the copper oxide rectifier washers, and a cylindrical bushing (not shown) made of electrically insulating material is mounted on the bolt 45 so as to extend through the copper oxide rectifier washers and the enlarged holes in the plates 26 and 31. Also, washers 48a and 48b made of electrically insulating material are provided on the outer sides of the plates 26 and 31, and the cylindrical insulator (not shown) around the bolt 45 extends through these two insulating washers. Thus with this construction the bolt 45 is electrically insulated from the plates 26 and 31 and from the rectifier discs between the plates. These parts are clamped together by the nut 46 on the bolt.

The resistor 19, as previously stated, has its resistance conductor embedded in electrically insulating material and it is provided with a central longitudinally extending aperture through which the bolt 45 extends in electrically insulated relation with the resistor. The nut 47 is clamped firmly against the outer end of the resistance so as to secure it between the two nuts.

As shown in Figs. 1 and 2, the voltage coil 18 and the current coil 14 are mounted on two core members extending through them and magnetically connected together by means of a plate 48 made of magnet core material to form a U-shaped magnet. This magnet operates an armature 49 pivoted centrally on a bracket 50 which is secured to the top of the core member 50a. Adjacent the other end of the armature 49 is carried a movable contact 51 which cooperates with a stationary contact 52 carried by the conducting support 26. As a magnet core material I preferably use a low magnetic residual material, such as an alloy of nickel and iron.

An electrical connection for the movable contact 51 is made by a conductor 53 having one end connected to a bracket 54 which is mounted on the plate 48. The other end of this conductor 53 is connected to another terminal (not shown) just behind the terminal 25, as seen in Fig. 2. This terminal (not shown) is connected to the side of the generator opposite that side to which the terminal 25 is connected. Thus the movable contact 51 is connected in an electric circuit through the conductor 53, the bracket 54, the plate 48, core member 50a and bracket 50, to the armature 49.

The bracket 54 forms a stop for the upper end of the armature 49, as seen in Fig. 1, a disc 55 of electrically insulating material being secured to the end of the bracket so as to be engagd by the end of the armature 49 when the armature is pulled to its unattracted position by means of the biasing spring 56. An adjustment is provided for the tension of this spring 56 consisting of a U-shaped strap 57 having one end secured to the magnet plate 48 and its other end to which the spring 56 is secured adjustable by means of a screw 58.

While I have shown a particular embodiment of my invention, it will be understood, of course, that I do not wish to be limited thereto, since many modifications may be made and I therefore contemplate by the appended claims to cover any such modifications as fall within the true spirit and scope of my invention.

What I claim as new and desire to secure by Letters Patent of the United States is:

1. The combination with a generator of storage battery, a normally open load switch for connecting said battery to said generator for charging of said battery, an operating coil for said load switch, a normally open relay switch in circuit with said operating coil, connections connecting said operating coil through said relay switch across said generator, a voltage coil for operating said relay switch, a copper oxide rectifier, electric connections connecting said voltage coil and said copper oxide rectifier in series with each other across said generator, said copper oxide rectifier being connected with a polarity such as to pass current and energize said voltage coil in response to a generator voltage of a predetermined battery charging polarity and said voltage coil being arranged to close said relay switch in response to a predetermined value of said generator voltage whereupon said operating coil is energized and closes said load switch, said copper oxide rectifier preventing the energization of said voltage coil in the event of reversal of the voltage of said generator, and a current coil for said relay switch connected in circuit with said generator in a direction to be cumulative with respect to said voltage coil in response to a battery charging current but bucking said voltage coil to open said relay switch upon the occurrence of a reverse generator current of a predetermined value.

2. A battery charging control device comprising an electrically insulating base, a normally open charging switch on said base, an operating coil on said base for operating said charging switch to its closed circuit position a relay switch in circuit with said operating coil, a voltage coil for operating said relay switch, a terminal plate of electrically conducting material secured to said base, a copper oxide rectifier disc having a central aperture, a second terminal plate, said plates being provided with apertures, a cylindrical resistance having a central aperture a clamping bolt extending through the apertures in said terminal plates, said rectifier disc and said resistance, means electrically insulating said bolt from said parts, said bolt clamping said terminals and said copper oxide disc together to form a copper oxide rectifier supported by said first terminal plate, and said bolt securing said resistance to said first terminal plate, and electrical connections connecting with said terminal plates and the terminals of said resistance thereby to connect said rectifier and said resistance in series with each other in the circuit of said voltage coil.

LOUIS W. THOMPSON.